United States Patent [19]

De Greef

[11] Patent Number: 4,830,195
[45] Date of Patent: May 16, 1989

[54] HIGH SPEED MECHANICAL WEIGHING SYSTEM

[75] Inventor: Jan A. De Greef, Tricht, Netherlands

[73] Assignee: 501 De Greef's Wagen, Netherlands

[21] Appl. No.: 7,754

[22] Filed: Jan. 28, 1987

[30] Foreign Application Priority Data

Jan. 31, 1986 [NL] Netherlands .......................... 8600243

[51] Int. Cl.⁴ .................................................. B07C 5/24
[52] U.S. Cl. ....................................... 209/646; 177/50;
 177/172; 209/648; 209/912
[58] Field of Search ............... 209/592, 912, 645, 646,
 209/647, 648, 649; 198/504, 505, 715; 177/50,
 145, 172

[56] References Cited

U.S. PATENT DOCUMENTS

| | | | |
|---|---|---|---|
| 1,224,379 | 5/1917 | Honohan | 209/649 |
| 3,092,196 | 6/1963 | Sheetz | 177/170 |
| 3,372,804 | 3/1968 | Puoti | 209/646 |
| 3,545,614 | 12/1970 | Sheetz | 209/646 |
| 3,642,130 | 2/1972 | Altenpohl | 177/50 |
| 4,262,807 | 4/1981 | Leverett | 209/592 |
| 4,411,366 | 10/1983 | De Greef | 209/646 |
| 4,413,690 | 11/1983 | Peterson | 198/504 |

FOREIGN PATENT DOCUMENTS 0037142 3/1981 European Pat. Off. .
0185424 6/1986 European Pat. Off. .
2142580 2/1973 France .

Primary Examiner—Johnny D. Cherry
Assistant Examiner—Donald T. Hajec
Attorney, Agent, or Firm—John P. Snyder

[57] ABSTRACT

A high speed mechanical weighing system includes a series of article holders carried by chains and forming a flexible conveyor in which the holders are individually pivoted for movement between carrying and discharging positions. The mechanical weighing devices are spaced along the path followed by the holders with stationary guides alongside the holders which are periodically interrupted to accommodate vertically movable weighing guides. The holders have support members which bear either upon the stationary guides or upon the weighing guides. The holders are closely spaced so that a rearmost support member of a leading holder is positioned to laterally overlap but not bear upon the foremost weighing guide member of a weighing station at which the trailing holder is being weighed. The weighing guide members are sufficiently long as to effect accurate mechanical weighing even if the holders are traveling at high speed.

13 Claims, 5 Drawing Sheets

HIGH SPEED MECHANICAL WEIGHING SYSTEM

BACKGROUND AND BRIEF SUMMARY OF THE INVENTION

The invention relates to a high speed weighing system in which products are classified as to weight.

Such a device is known from US-A-4413690. The processing capacity of this compact device is high, that is, the drive speed is high, while the holders can lie close together in series. The holders with the products lying in them are weighed on a weighing station, and the weight is recorded in a memory, from which are initiated the activating means of the relevant, selected discharge station for setting the discharge means into operation at the point in time that the relevant holder passes that dicharge station. The electronic apparatus is expensive and experience has shown that the users of the device of the type in question have great difficulty with it when they wish to alter or adjust anything. The invention provides a device of the type referred to in the preamble which combines a large capacity with a compact device, whereby, however, the electronic apparatus for weight recording and control of activating means is unnecessary.

In this device according to the invention the processing capacity can be high since the speed of movement of the flexible member can be high. Despite such a high speed, the holders can nevertheless remain on the weighing-guide members long enough not only for the weighing to be carried out but also for adjustment of the activating means for the discharge of the product at the discharge station, all this using only mechanical means. In this case the device is highly simplified in relation to the known devices which have electronically or electrically controlled activating means.

Preferred embodiments are denoted in the following claims.

The features and advantages of the invention will be elucidated in the following description with reference to drawings.

BRIEF DESCRIPTION OF THE DRAWING FIGURES

Figure 1:
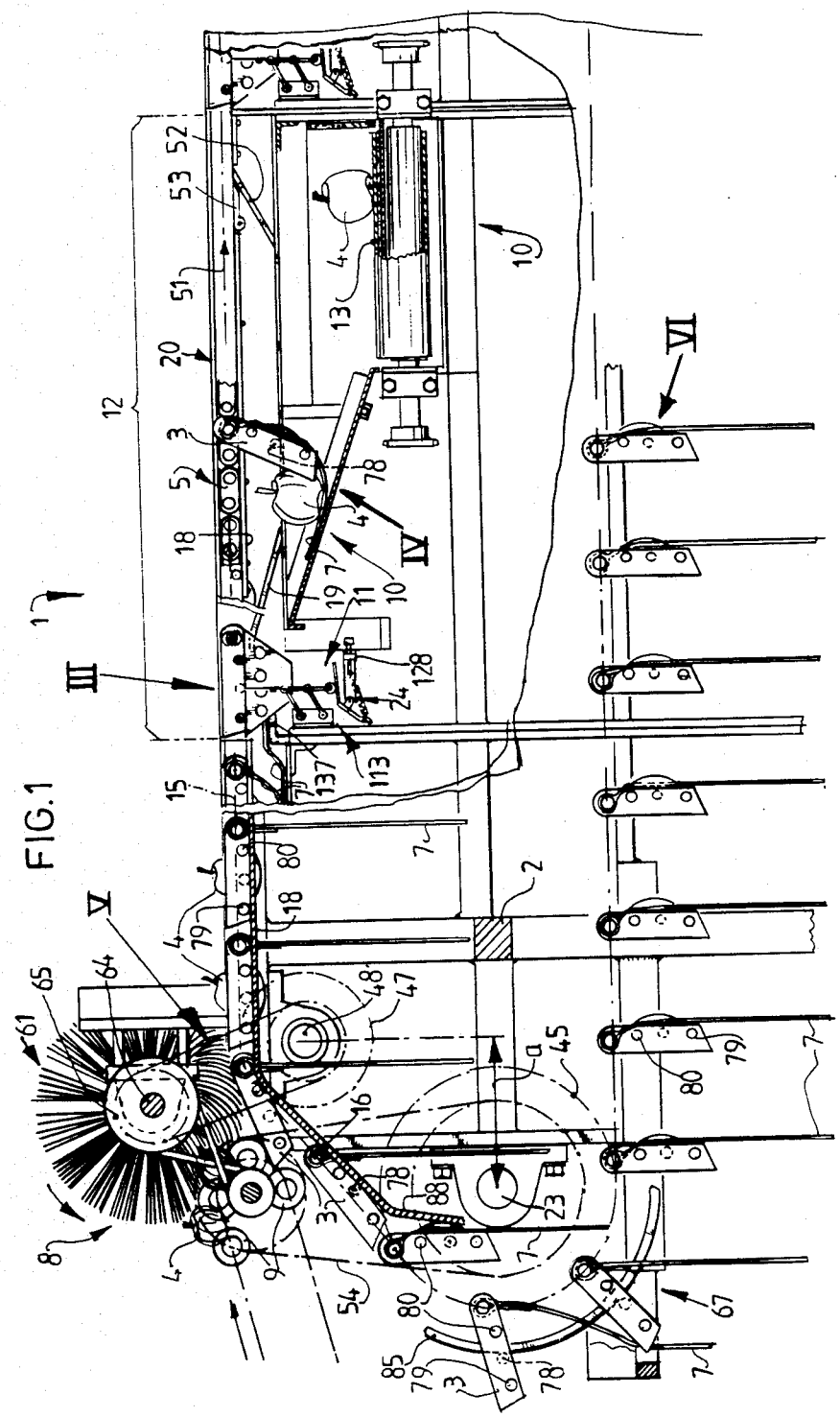
FIG. 1 is a partial lengthwise section of a device according to the invention.
Figure 3:
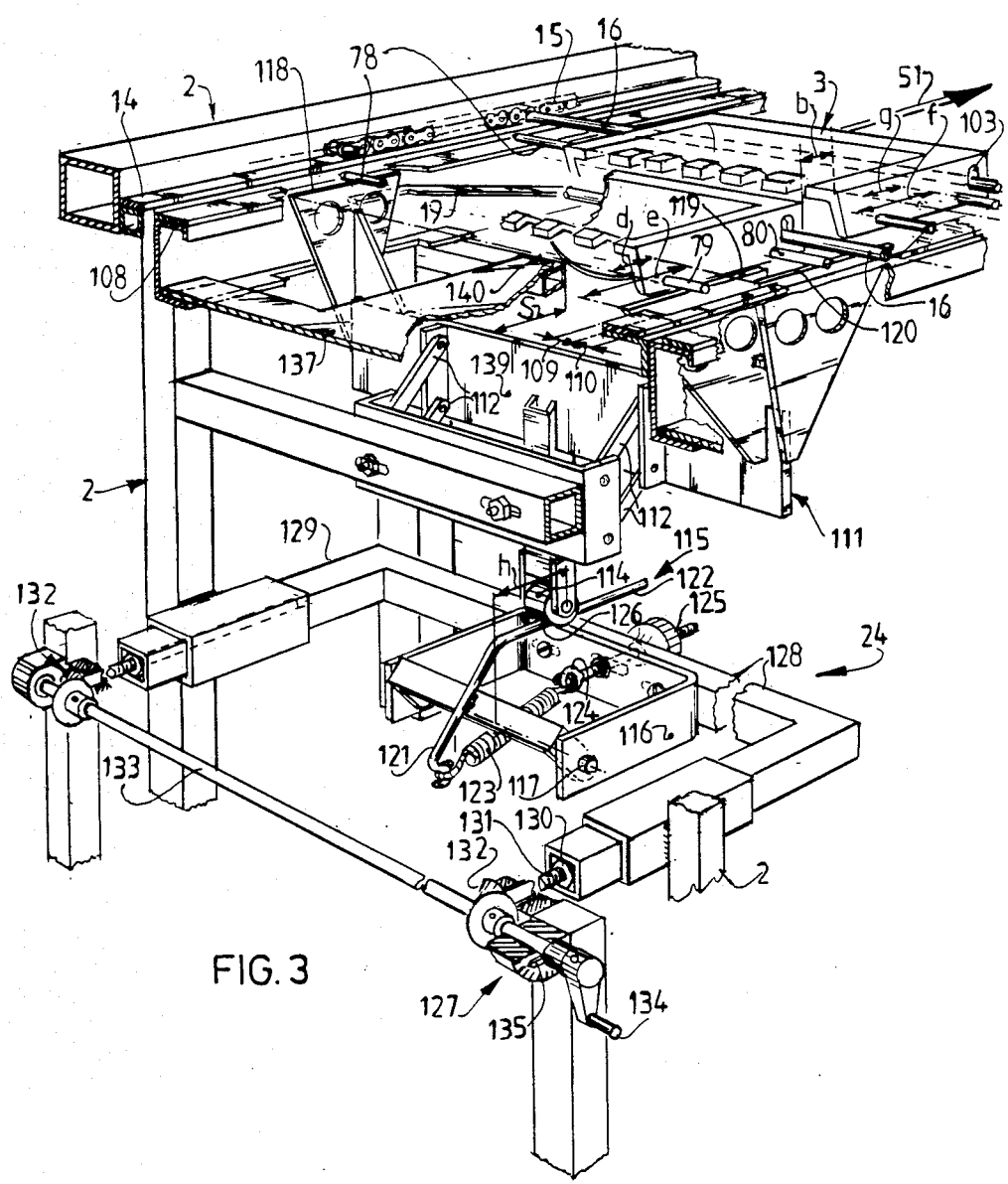
Figure 4:
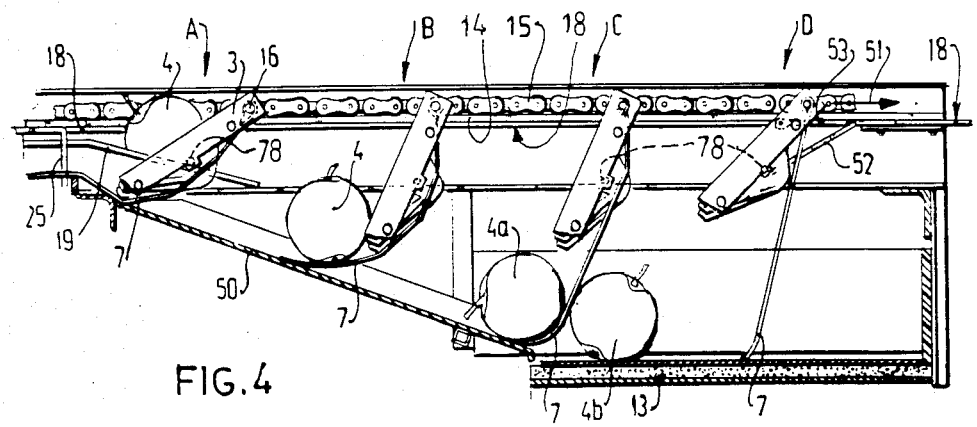
Figure 5:
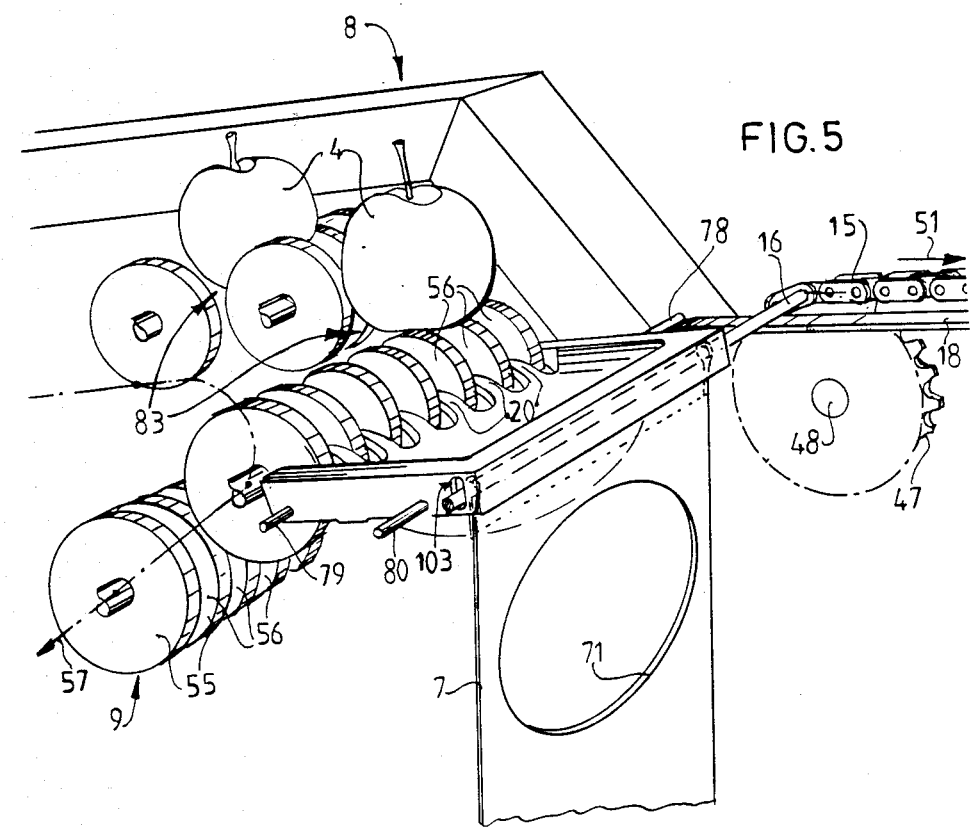
Figure 7:
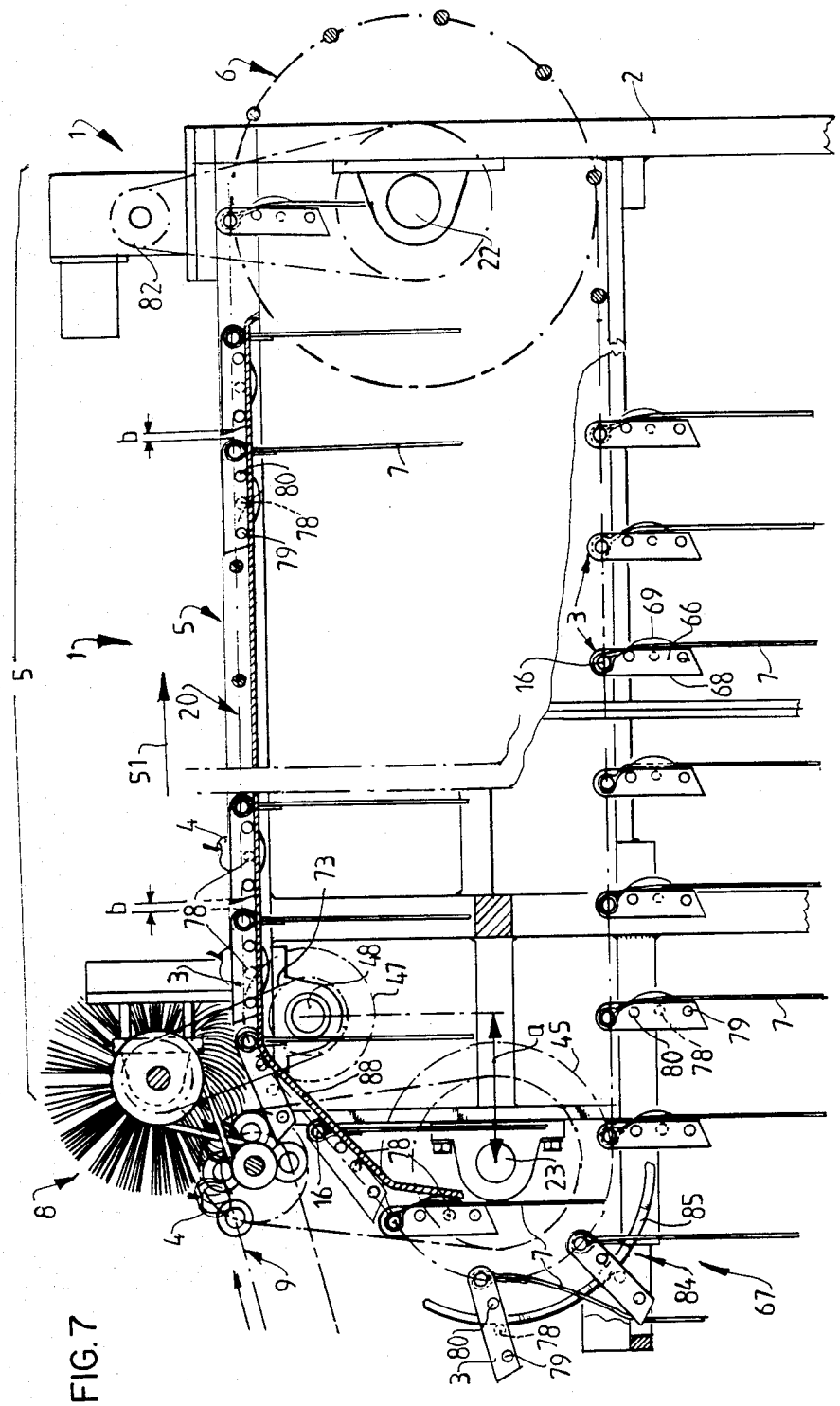

FIG. 3 is a broken away, perspective view on a larger scale of detail III of the device from FIG. 1, FIG. 4 is detail IV from FIG. 1 on a larger scale, showing in a number of positions the manner in which a fruit is guided by a strip, FIG. 5 is a perspective, partial view on a larger scale of detail V from FIG. 1, FIG. 6 shows on a larger scale a perspective view of detail VI from FIG. 1, and FIG. 7 shows on a large scale details of the anchor ends of a flexible member of the device from FIG. 1.

DETAILED DESCRIPTION OF THE INVENTION

Figure 2:
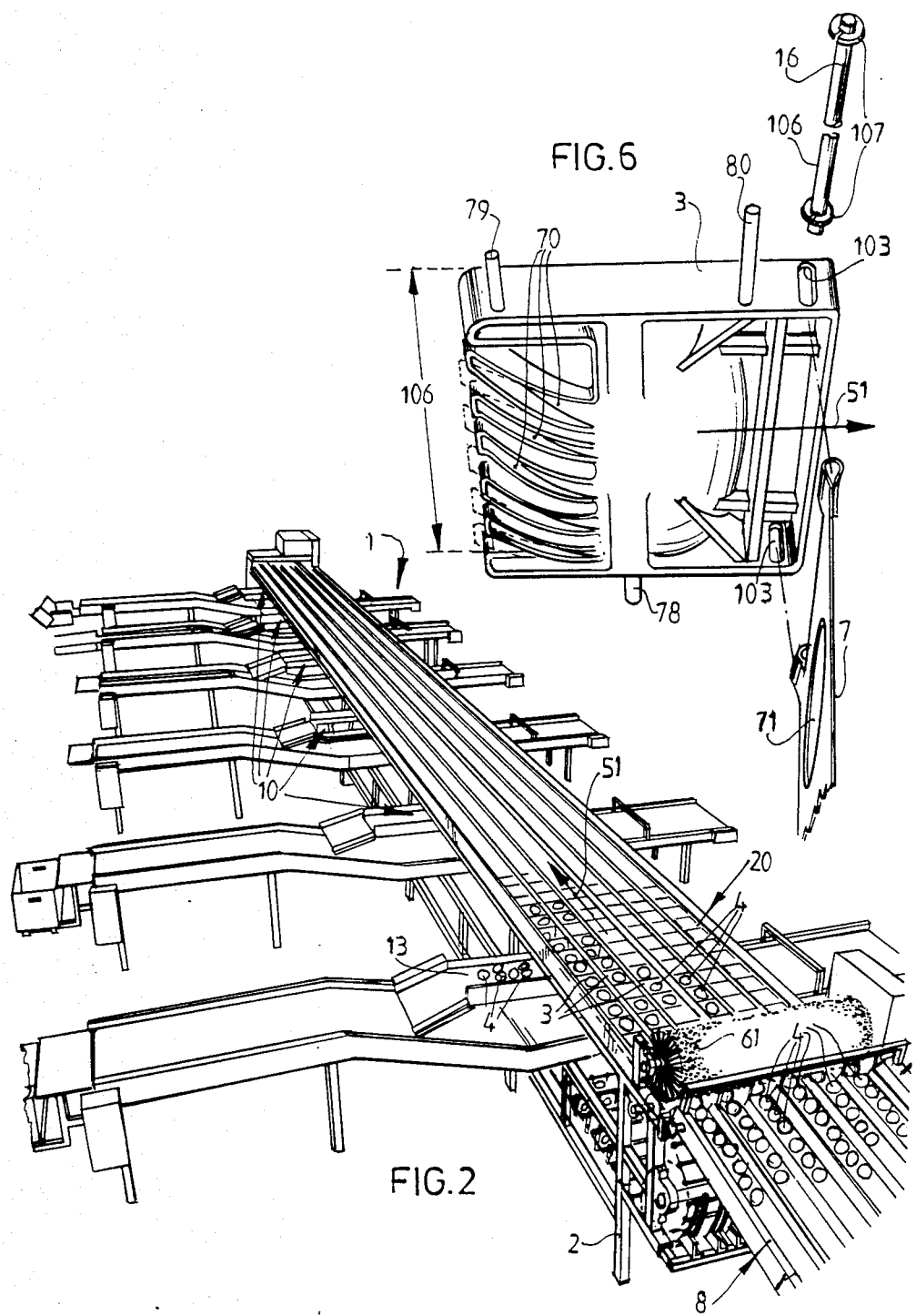
FIG. 2 is a perspective view of the device from FIG. 1.

The device 1 for sorting products 4, such as fruit, comprises a frame 2, in which two guide wheels 6 are mounted at the rear end for rotation on a common shaft 22. At the front end two smaller chain wheels 45 are mounted on a shaft 23. Above chain wheels 45 are located further a set of guide wheels 47 which can rotate on a shaft 48 which is situated at an interval a inwards relative to shaft 23. FIG. 2 shows that the device 1 comprises six rows of holders 3 lying next to one another. In each case six holders 3 are arranged on one and the same shaft 16 between two chains 15. Holders 3 are arranged at a small interval b from one another in their series, so that together with chain 15 they form a flexible member 20 resembling a conveyor belt. Extending on the upper side between the guide wheels 47, 6 is a horizontal section 5 of this flexible member 20. This is the forward moving part.

The products 4, particularly fruit, are carried into the holders 3 at a supply station 8 such that a product 4 is laid carefully in each case into each holder 3 by a feeding device 9. The products 4 carried into holders 3 in the feeding station 8 are conveyed over the horizontal section 5 in the direction of movement 51 of the flexible member 20, the latter being driven by a drive 82 via guide wheels 6. During this movement products 4 are discharged, depending on the weight which determines a products class, into a determined discharge station 10 of the horizontal section 5. One discharge station 10 is shown in FIG. 1. There will have to be as many discharge stations 10 present in a sorting device 1 as there are product classes into which products 4 have to be sorted. In order to enable alteration of the number of discharge stations 10, each discharge station 10 is preferably accommodated in a discharge unit 12, the required number of which is included in a sorting device 1. In each discharge station 10a holder 3 can be moved by activating means 11 from a conveying position to a discharge position, whereby the relevant product 4 is discharged in that discharge station 10. In the device 1 from FIG. 1 the weight is the product parameter which determines into which product class the product 4 concerned falls. For this reason the activating means 11 comprise a weighing mechanism 24. Located in discharge station 10 is an endless belt 13 which can transport the products 4 supplied by holders 3, for example, to a packaging device (not shown).

Each chain 15 is supported in the horizontal section 5 by a chain guide track 14. Each holder 3, which as can be seen has a a cupped form, can—in the conveying position in the conveyor section of the flexible member 20—be moved, as a result of vertical slots 103, in vertical direction relative to the shaft 16 inserted through slots 10, so that holder 3 does not then support on shaft 16. The holder 3 is locked in transverse direction onto the shaft 16 by means of spring rings 107 located in annular grooves 105 of the shaft (FIG. 6).

The holder 3 is shorter in the direction of movement 51 than in the direction 106 crosswise of it, so that holder 3 is particularly suitable for accommodating round as well as elongate products 4. Holder 3 has three separately located support members 78, 79 and 80 which support on guide means 108, 109, 110 formed by horizontal strips, in which, at each dicharge station 10, are accommodated weighing guide means which are each formed by a weighing guide member 118, 119, 120 respectively which are firmly connected to one another and to a weighbridge 111. Guide means 108–110 as well as the weighing guide members 118–120 accommodated in them lie—as seen in the direction of movement 51—next to one another in an area through which pass the support members 78, 79 and 80 respectively that are supported by them.

Support members 78, 79, 80 consist of round guide pins whereby it should be particularly noted that guide member 79 is shorter than guide member 80, so much shorter in fact that guide member 79 does not extend as far as guide means 110 and weighing guide members 120 (see FIG. 3). The weighing guide members 118, 119, 120 are—as seen in the direction of movement 51—staggered relative to one another, that is, in the same way as the support members 78, 79, 80 are arranged staggered relative to one another. The stagger dimensions e and d of weighing guide members 120 and 118 respectively relative to weighing guide members 119 are preferably substantially equal to the stagger dimensions f and g of the guide means 80, 78 supported by members 120, 118 relative to the guide means 79 supported by menbers 119. When holders 3 lie at a small distance from one another the rearmost guide member 79 of a preceding holder 3 can, as a result of the staggered arrangement, be situated alongside a weighing guide member 120 on which a guide member 80 of the following holder 3 is already supporting. Weighing guide members 118–120 can be as a result be comparatively long, so that when flexible member 20 has a high speed the holders 3 still continue to support on the weighing guide members sufficiently long enough to effect even a mechanical weighing and to move the weighing guide members 118–120 downwards mechanically.

Thus, each holder 3 will arrive at a position in which all of its support members 78, 79 and 80 bear upon the weighing guide members 118, 119 and 120. Just prior to this moment, having reference to the leading holder 3 which is designated L in FIG. 3, its intermediate support member 78' will be resting on the stationary guide member 108 just at the start 108' of the interruption accommodating the weighing guide member 118, the suport members 79' and 80' will be resting on the respective stationary guide members 109 and 110 just at the start 109S of the interruption accommodating the weighing guide member 110 and at the start 110S of the interruption accommodating the weighing guide member 120, and the opposite ends of the shaft or pivot means 16 will rest upon the respective chain guides 14. Assume that the weight of an article in the leading holder L does not depress the weighing guide members 118, 119 and 120 sufficiently to allow the holder L to move vertically downwardly by an amount such that its support members 78', 79' and 80' would pass beneath the endings 108E, 109E and 110E of the interruptions accommodating the respective weighing guiding elements 118, 119 and 120, the leading holder L will pass beyong the interruption defining the weighing and discharge station corresponding to the weight classification of that station and once again bear upon the respective guide means 108, 109 and 110. Assuming that an article carried by the trailing holder T does have enough weight to depress the weighing guide elements 118, 119 and 120 sufficiently so that its support members 78, 79 and 80 will pass beneath the ends 108E, 109E and 110E and thus discharge the article beyond the weighing and discharge station corresponding to the weight classification of that station as is illustrated in FIG. 1, the holder T will thereafter be in hanging condition from the shaft or pivot means 16 and no longer presents support members which can bear upon either the stationary guide means or the weighing guide means. At the same time as the support members 78, 79 and 80 of the trailing holder T begin to bear upon the weighing guide means 118, 119 and 120, the leading holder L is spaced such a small distance b from the trailing holder T that its rearward support member 79' is spaced laterally inwardly of the weighing guide member 120 and thus cannot overlie and bear upon it. As noted, this permits the support members to bear upon the respective weighing guide members 118, 119 and 120 for a sufficiently long time, even though the flexible member 20 is operated at high speed, that an effective mechanical weighing can be effected.

The weighbridge 111 is connected to frame 2 with four rods 112 of a parallelogram system of rods 113 so that the weighing guide members 118–120 remain horizontal. Weighbridge 111 bears with its roller 114 on a roller supporting member in the form of a rod 115. The upper end 122 of this rod 115 extends in its rest position horizontally in the direction of movement 51 and can pivot relative to a weighing frame 116 on a shaft 117. The lower end 121 of rod 115 is connected to a tension spring 123 which is fastened to an attachment piece 124 which can be adjusted in the direction of movement 51 by means of a screwed rod 125 for pre-tensioning of the spring 123.

The product class of a particular discharge station 10 or its set weight is determined by setting of the lever arm h between the point of contact 126 of roller 114 on the rod 115 on the one side and the shaft 17 on the other—as seen in the direction of movement 51. In view of the fact that the point of contact 126 is fixed when rod 115 is in rest position, shaft 117 and, for this purpose, the weighing frame 116 are adjusted using an adjustment mechanism 127, of which the adjusting beam 128 is coupled via attachment means to all the weighing frames 116 of one and the same discharge station 10. This adjusting beam 128 is guided in the direction of movement 51 relative to frame 2 by means of guide bars 129, while both ends of the adjusting beam 128 have a screwed bush 130 which co-operates with a screwed rod 131. The two screwed rods 131 are each mounted for rotation in frame 2 and are coupled by means of a bevel drive gear 132 to an adjusting shaft 133 which is mounted for rotation in frame 2, extends crosswise of the direction of movement 51 and which has an operating handle 134 and a scale indicator 135 for indicating the set weight class.

In the conveying position holders 3 remain horizontal because they bear by means of their support members 78–80 on guide means 108–110 and/or weighing guide members 118–120 while they slide over them. If, as a result of the weight of holder 3 and the product 4 accommodated in it, the moment applied by the weighbridge 111 to rod 115 is greater than the moment resulting from the spring loading, the weighbridge 111 will make the rod 115 pivot downwards, as a result of which the support member 80 comes into contact with discharge track 19. As it moves further holder 3 then reaches the discharge position. Weighing guide member 120 has an end (not drawn) that is rounded off downwards to allow the downward movement of guide member 80 to the discharge track 19 to proceed gradually.

In this embodiment the dimensioning of the weighing mechanism 24 is such that the force applied by roller 114 to the rod 155 becomes smaller as rod 115 pivots downwards. This is the case because the moment caused by the tension spring 123 as a result of the moment arm becoming smaller is hereby greater than the increase resulting from the stretching of tension spring 123. This has the great advantage that, even when the force applied by the weighbridge 111 to the rod 115 is only slightly above the set value, rod 115 nevertheless pivots downwards quickly, with the result that the device 1 can operate at high speed. Instead of a weighing mechanims 24 operating with a tension spring 123, a weighing mechanism provided with a counterweight can also be used.

As is shown in FIG. 3, the fixed guide tracks 18 forming guide means 108–110 are interrupted at the start of a discharge station 10 at the point of the activating means 11. The guide members 78–80 of a holder 3 do not therefore slide over the fixed holder guide track 18 here but over the weighbridge 111 instead. In the case that the weight of the product 4 is heavier than the set weight of a discharge station 10 that has been reached, rod 15 pivots on shaft 117. The weighbridge 111 is locked in a particular set position and this set position is such that the upper side of weighbridge 111 lies in the same plane as holder guide track 18 so that the guide members 78–80 of holder 3 move evenly from the holder guide track 18 onto weighbridge 111 and can if required move back again from weighbridge 111 onto holder guide track 18.

Co-operating with each holder 3 is a flexible strip 7 for guiding a product 4 supplied by holder 3 into a discharge station 10. Strip 7 is a flexible, slack piece of plastic foil or, for example, rubbered cloth. On of the things shown in FIG. 4 is that under each holder 3 in the embodiment shown a strip 7 is fitted around shaft 16 with a loop. When the force applied by the weighbridge 111 to rod 115 as a result of the weight of the product 4 is now greater than the set value, guidemember 78 falls onto the discharge track 19. When the chain 15 moves further to the right in the direction of movement 51, holder 3 then tilts out of the horizontal conveying position via the position at A into the discharge postion at B. Product 4 hereby rolls out of holder 3 onto the strip 7. There is preferably arranged in each discharge station 10 a slideway 50 which extends sloping downwards in the direction of movement 51 of holders 3 and co-operates with strips 7. Should however longer strips 7 be used than the strips 7 from FIG. 4, such a slideway 50 is not per se necessary. After discharge of the product 4 guide member 78 comes onto a rising part 52 of the discharge track 19 which guides guide member 78 back to the holder guide track 18, so that holder 3 returns to the horizontal position. Located for this purpose in the holder guide track 18 above the rising part 52 is a spring-mounted or folding guide track piece 53 that can pass underneath a guide member 78.

The supply station 8 (see FIG. 5) preferably comprises a disc transporter 9 as feeding device. For each series of holders 3 the disc transporter 9 comprises a series of, in this example six, associated discs 55, 56. These discs 55, 56 are moved according to a path 57 in a manner per se known. The movement of the disc transporter 9 comprising discs 55, 56 is synchronized with flexible member 20 comprising holders 3, since the disc transporter is driven from a shaft 23 by means of the chain drive 54. Synchronization of the disc transporter 9 and holders 3 is such that, when a product 4 is fed between two sets of six discs 55, 56, a holder 3 is in each case available to accommodate this product 4. By giving the holder 3 a form such as its shown in detail in FIG. 6, it can co-operate well with the disc transporter 9. To this end the holder 3 comprises fingers 70 which can protrude between the discs 55, 56 of disc transporter 9. As a result product 4 has to move only over a small distance from disc transporter 9 into holder 3. By manufacturing holder 3 from a suitable material, preferably plastic, the fingers 70 can be flexible so that a product 4 coming into contact with them has to absorb only small impact forces and is not damaged. The flexible fingers 70 form receiving members which given when a product 4 is carried into a holder 3.

The supply station 8 also comprises a cylindrical brush 61 the shaft 64 of which runs parallel to shaft 58 on which are mounted the guide wheels 6. Brush 61 is driven by means of a chain drive gear 73 at the same peripheral speed as the forward moving speed of holder 3. The products 4 transferred from disc transporter 9 to holders 3 are retained in these holders 3 directly by this brush 61, ensuring that they are held motionless in them.

As further shown in FIG. 6, the strip 7 which cooperates with a holder 3 has a cut out portion 71. It is evident that strip 7 may not influence the weighing. It is for this reason that the strip 7 is fitted around the shaft 16 of holder 3, while the free end of strip 7 slides over a flat horizontal plate 137 which is attached to the frame 2 before each discharge station 10. During weighing strip 7 hangs forming a curve between weighing guide members 118 and 119 and above the transverse beam 139 of weighbridge 111. The strip 7 of a preceding holder 3 also supports on the edge 140 of the plate 137 which protrudes over cross beam 139 for a distance S. The cut out portion 71 is arranged in strip 7 in order to prevent the strip 7 pressing against this holder 3 on the underside during weighing of the holders 3 and consequently influencing the measurement. From FIG. 4 is also apparent that as a result of the cut out portion 71 strip 7 is better able to arrange itself around the underside of holder 3.

As FIG. 7 shows, the holder 3 hang straight downwards in the returning part and the flexible strips 7 each hang against the base 66 of the associated holder 3. As a result each strip 7 is located in the returning part of the flexible member 20 in front of the carrying side 68 of the following holder 3, while for a well functioning device 1 it is necessary that in the section 5 the strips 7 are located not above but beneath the following holders 3.

To this end the device 1 comprises strip turn-over means 84 for displacing in each case a flexible strip 7 associated with a holder 3 from the carrrying side 68 of a following holder 3 to the bottom side 69 of this following holder 3.

The strip turn-over means 84 from FIG. 7 comprise for each of the six rows of holders 3 a curved guide strip 85 onto which grip the pins 78 of the holder. The form of each strip 85 relative to the turn-over path of flexible member 20 is curved such that the holders 3 are carried at the turn-over end 67 from the downward hanging position into a tilted position drawing in FIG. 7 with dashed lines. When the pins 78 pass by the end 86 of guide strips 85 they fall back to more of a downwardly hanging position, thereby pulling with them the associated strips 7 and transferring them onto the underside 69 of the following holders 3. Holders 3 are then carried upwards, whereby the pins 78 are guided over a guide strip 88 in an upwardly inclined direction, the strip 88 connecting on the holder guide track 18.

I claim:

1. A high speed weighing system comprising the combination of a flexible member defined by a series of holders disposed in spaced apart relation and movable in unison along a horizontal path, each holder including pivot means pivotally connecting it for limited vertical movement and swinging motion relative to the flexible member at least three support members extending from each holder in different longitudinally spaced trailing relation to pivotal and lost motion connection to its associated transverse each other along the flexible member, horizontal guide means for supporting each holder in horizontal position through its associated support members, said horizontal guide means including spaced interruptions defining product weighing and discharge stations to allow said support members of each individual holder to terminate their support on the guide means, weighing means at each of said interruptions and including plural weighing elements movable in unison for vertically yieldably taking over support of each holder which passes thereover, each weighing means being responsive to a different product weight to allow each holder bearing that different weight to depress the weighing means sufficiently to allow the support members thereof to pass beneath the guide means beyond the interruption therein so that the holder is allowed to swing downwardly about its pivot means and discharge a product beyond the associated weighing station, the spacing between successive holders and between successive interruptions being such that the most rearward support member of a leading holder is in laterally spaced relation to but does not overlie a weighing element of a trailing weighing and discharge station while the other two support pins thereof are supported on the guide means beyond such trailing weighing and discharge station.

2. A high speed weighing system comprising the combination of a series of holders disposed in spaced apart relation defining a flexible member and movable in unison along a horizontal path, the flexible member including connecting means pivotally connecting each holder for limited vertical movement and for swinging motion relative to the flexible member, at least three support members extending from each holder in differnt longitudinally spaced trailing relations to each other, horizontal guide means for supporting each holder in carrying position through its associated support members, said horizontal guide means including spaced interruptions defining weighing and discharge stations to allow said support members of each individual holder to terminate their support on the guide means, weighing means at each of the interruptions and including plural weighing guide members, one for each support pin, movable in unison for vertically yieldably taking over support of each holder which passes thereover, each weighing means being responsive to a different product weight to allow each holder bearing that weight to depress the weighing means sufficiently to allow the support members thereof to pass beneath the guide means beyond the interruption therein so that the holder is allowed to swing downwardly about its connecting means and discharge a product beyond the associated weighing station, the spacing between successive holders and between successive interruptions being such that the most rearward support member of a holder, which is in its is in laterally spaced relation to but does not overlie a weighing element of a trailing weighing and discharge station while the other two support members thereof are supported on the guide means beyond such trailing weighing/discharge station.

3. A high speed weighing system as defined in claim 2 wherein there are three weighing guide members which are staggered relative to each other by amounts which substantially correspond to the amount by which the three support members are staggered relative to each other.

4. A high speed weighing system as defined in claim 2 including inclined guide means for cooperating with one of the support members of each holder to control downward swinging of such product-receiving member.

5. A high speed weighing system as defined in claim 2 wherein each holder is shorter in the direction of the path than in the direction transverse thereto.

6. A high speed weighing system as defined in claim 5 wherein two of the three support members of each holder project from one side thereof and of which the rearmost support member is shorter than the foremost support member.

7. A high speed weighing system as defined in claim 2 including a frame, the plural weighing, guide members corresponding to each weighing means being connected to the frame through a parallelogram linkage.

8. A high speed weighing system as defined in claim 7 wherein each weighing means is mounted on the frame and includes a pivoted arm, the plural weighing guide members of each weighing means being connected to a roller bearing upon an associated arm.

9. A high speed weighing system as defined in claim 8 including means for adjusting each weighing means back and forth in the direction of the path to set the weight to which each weighing means is responsive.

10. A high speed weighing system as defined in claim 9 wherein the means for adjusting is common to all of the weighing means.

11. A high speed weighing system as defined in claim 10 wherein the means for adjusting includes a rotatable shaft carried by the frame transverse to the path and transmission means for converting rotary motion of the shaft to movement parallel to the path.

12. A high speed mechanical weighing system comprising the combination of endless flexible conveyer means for conveying a sequence of at least two holders along an endless path which includes a horizontal portion a series of mechanical weighing means disposed in longitudinally spaced relation to each other with respect to said horizontal portion of the endless path and each mechanical weighing means including a pair of laterally spaced weighing guide members extending along one side of the horizontal portion of the endless path and in overlapped, longitudinally staggered relation to each other to present a leading and a trailing weighing guide member, stationary guide means along said horizontal portion of the endless path and including interruptions within which the weighing guide members are located, each holder having a forward support member and a rearward support member on one side thereof and in which the forward support member so that the forward support member may bear upon both the leading and the trailing weighing guide members whereas the rearward support member may bear only upon the trailing weighing guide member, the leading holder of the two being spaced longitudinally from the trailing holder by an amount which positions its rearward support member in longitudinally overlapped but non-overlying relation to the leading weighing guide member while both support members of the trailing holder bear upon their respective weighing guide members.

13. A high speed mechanical weighing system as defined in claim 12 wherein there are three support members, the two on one side of each holder and a third on the opposite side of each holder.

* * * * *